US008363697B2

(12) United States Patent
Grob et al.

(10) Patent No.: US 8,363,697 B2
(45) Date of Patent: Jan. 29, 2013

(54) SYNCHRONIZED BROADCAST/MULTICAST COMMUNICATION (75) Inventors: Matthew S. Grob, La Jolla, CA (US); Peter J. Black, San Diego, CA (US); Srikant Jayaraman, San Diego, CA (US); Paul E. Jacobs, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 1323 days.

(21) Appl. No.: 11/041,136

(22) Filed: Jan. 20, 2005

(65) Prior Publication Data

US 2005/0175070 A1    Aug. 11, 2005

Related U.S. Application Data (60) Provisional application No. 60/537,955, filed on Jan. 20, 2004.

(51) Int. Cl.
*H04B 1/707*    (2011.01)
*H04B 7/216*    (2006.01)
*H04B 15/00*    (2006.01)
*H04H 20/71*    (2008.01)

(52) U.S. Cl. ........ 375/146; 375/147; 375/260; 370/312; 370/335; 455/503

(58) Field of Classification Search .................. 375/140, 375/141, 145, 146, 147, 260; 370/335, 342, 370/441, 312, 432; 455/422.1, 500, 501, 455/502, 503, 507; 348/21
See application file for complete search history.

(56) References Cited

U.S. PATENT DOCUMENTS

| | | | |
|---|---|---|---|
| 5,008,900 A | | 4/1991 | Critchlow et al. |
| 5,345,439 A | | 9/1994 | Marston |
| 5,353,307 A | * | 10/1994 | Lester et al. ................... 455/503 |
| 5,574,968 A | | 11/1996 | Olds et al. |
| 5,809,060 A | * | 9/1998 | Cafarella et al. .............. 375/146 |
| 5,867,478 A | | 2/1999 | Baum et al. |
| 6,005,605 A | * | 12/1999 | Kostreski et al. ............... 348/21 |
| 6,091,717 A | * | 7/2000 | Honkasalo et al. ........... 370/329 |
| 6,256,508 B1 | * | 7/2001 | Nakagawa et al. ........... 455/503 |
| 6,470,188 B1 | | 10/2002 | Ohtani et al. |
| 6,542,755 B1 | | 4/2003 | Tsukagoshi |

(Continued)

FOREIGN PATENT DOCUMENTS

| | | |
|---|---|---|
| EP | 1267537 A2 | 12/2002 |
| GB | 2237706 | 5/1991 |

(Continued)

OTHER PUBLICATIONS

Rauch et al., "Hybrid Mobile Interactive Services combining DVB-T and GPRS," Proceedings of European Personal and Mobile Communications Conference, Feb. 19, 2001, pp. 1-8 (XP002278953).

(Continued)

*Primary Examiner* — Betsy Deppe
(74) *Attorney, Agent, or Firm* — Larry J. Moskowitz; S. Hossian Beladi (57) ABSTRACT Synchronized broadcast transmits a same broadcast content using a same waveform from multiple transmitters. Transmitters each apply a same spreading code for broadcast transmissions. In a spread-spectrum communication system having a time division multiplexed forward link, a synchronized broadcast transmission is inserted into a broadcast slot. One embodiment employs an Orthogonal Frequency Divisional Multiplex (OFDM) waveform for the synchronized broadcast. An OFDM receiver is then used to process the received synchronized broadcast transmission. An alternate embodiment implements a broadcast Pseudo-random Noise (PN) code for use by multiple transmitters. An equalizer is then employed to estimate the synchronized broadcast transmission.

12 Claims, 11 Drawing Sheets

U.S. PATENT DOCUMENTS

| | | | |
|---|---|---|---|
| 6,542,775 B2 | 4/2003 | Ding et al. | |
| 6,885,630 B2* | 4/2005 | Kostic et al. | 370/203 |
| 7,027,485 B2* | 4/2006 | Yue | 375/147 |
| 7,215,935 B2* | 5/2007 | Rao et al. | 370/208 |
| 7,500,261 B1 | 3/2009 | Myers | |
| 2002/0080742 A1* | 6/2002 | Proctor, Jr. | 370/335 |
| 2002/0086691 A1 | 7/2002 | Kostic et al. | |
| 2002/0093920 A1 | 7/2002 | Neufeld et al. | |
| 2002/0122382 A1 | 9/2002 | Ma et al. | |
| 2002/0150058 A1* | 10/2002 | Kim et al. | 370/342 |
| 2002/0181509 A1 | 12/2002 | Mody et al. | |
| 2003/0054805 A1 | 3/2003 | Fujisawa et al. | |
| 2003/0054807 A1 | 3/2003 | Hsu et al. | |
| 2003/0072255 A1 | 4/2003 | Ma et al. | |
| 2003/0095561 A1 | 5/2003 | Hwang | |
| 2003/0162547 A1 | 8/2003 | McNair | |
| 2003/0231726 A1 | 12/2003 | Schuchert et al. | |
| 2004/0078624 A1 | 4/2004 | Maxemchuk et al. | |
| 2004/0116139 A1 | 6/2004 | Yi et al. | |
| 2004/0174927 A1 | 9/2004 | Cooper | |
| 2005/0213538 A1 | 9/2005 | Ebiko et al. | |
| 2011/0134823 A1 | 6/2011 | Grob et al. | |
| 2011/0134824 A1 | 6/2011 | Grob et al. | |
| 2011/0134967 A1 | 6/2011 | Grob et al. | |

FOREIGN PATENT DOCUMENTS

| | | |
|---|---|---|
| JP | 2000175263 | 6/2000 |
| JP | 2003299141 A | 10/2003 |
| JP | 2004007279 A | 1/2004 |
| JP | 2005503044 A | 1/2005 |
| TW | 200306714 | 11/2003 |
| WO | WO 96/04717 | 2/1996 |
| WO | WO9628944 A2 | 9/1996 |
| WO | WO0161899 A1 | 8/2001 |
| WO | WO02075955 A1 | 9/2002 |
| WO | WO03007580 | 1/2003 |
| WO | WO 03/010901 | 2/2003 |

OTHER PUBLICATIONS

International Search Report—PCT/US2005/001591, International Searching Authority—European Patent Office—Sep. 19, 2005.

Written Opinion—PCT/US2005/001591, International Searching Authority—European Patent Office—Sep. 19, 2005.

International Preliminary Report on Patentability—PCT/US2005/001591, Preliminary Examining Authority/US—Alexandria, Virginia—May 17, 2006.

European Search Report—EP07100721,Search Authority—Munich Patent Office, Nov. 5, 2010.

Taiwan Search Report—TW094101723—TIPO—Jun. 23, 2011.

* cited by examiner

SYNCHRONIZED BROADCAST/MULTICAST COMMUNICATION

CLAIM OF PRIORITY UNDER 35 U.S.C. §119

The present Application for patent claims priority to Provisional Application No. 60/537,955 entitled "Soft Handoff Method and Apparatus for Spread-Spectrum Broadcast" filed Jan. 20, 2004, and assigned to the assignee hereof and hereby expressly incorporated by reference herein.

BACKGROUND

1. Field

The present invention relates to wireless communication systems generally, and specifically to synchronized broadcast or multicast transmission to improve the quality of the received transmission.

2. Background

Conventional broadcast/multicast transmissions in a wireless communication system provide broadcast content to multiple users, i.e., one to many, wherein multiple users receive a same broadcast content. Mobile Stations (MSs) may receive broadcast transmissions from multiple Base Stations (BSs). In a spread-spectrum system, each transmitter employs a unique spreading code to identify the transmitter. When a receiver is processing the transmission from one BS, the transmissions from other BSs may appear as interference, thus degrading the quality of the received transmissions as well as the broadcast/multicast transmission data rate. There is, therefore, a need to improve the reception quality for broadcast/multicast transmissions. There is further a need to optimize broadcast/multicast transmissions and increase the broadcast/multicast transmission data rate.

There is a need to reduce the interference caused by concurrent broadcast/multicast transmission from multiple transmitters and to increase the performance of transmission. In a broadcast/multicast transmission there is also a need to allow better flexibility and switching between broadcast/multicast and unicast transmissions.

BRIEF DESCRIPTION OF THE DRAWINGS

Various embodiments of the invention will become more fully apparent from the following description and appended claims, taken in conjunction with the accompanying drawings. Understanding that these drawings depict only example embodiments and are, therefore, not to be considered limiting of the invention's scope, the embodiments of the invention will be described with additional specificity and detail through use of the accompanying drawings.

DETAILED DESCRIPTION

Any embodiment described herein is not necessarily to be construed as preferred or advantageous over other embodiments. While the various aspects of the present invention are presented in the drawings, the drawings are not necessarily drawn to scale unless specifically indicated.

Generally, a unicast communication is from a single transmitter to a single receiver, or one-to-one. In a cellular communication system a unicast communication may involve multiple transmitters transmitting a communication to a single receiver. A multicast communication is a single message or communication sent to a group of users. Broadcast may be considered a type of multicast and generally refers to sending a message or communication to all users in a network, or a portion of the network. Recently, broadcast transmission refers to a multicast communication to a group of subscribers. Such as the broadcast of stock information to a group of cellular users who have subscribed to receive such service.

Broadcast may involve transmission of video and audio information, such as from televised programming or a radio transmission. The broadcast content information is provided as packetized data, such as in Internet Protocol (IP) packets. For a given broadcast service, the AN receives a stream of information from the content server, such as a television station, and provides the information, i.e., IP packets of information, on a designated channel to broadcast subscribers within the system.

Broadcast transmissions may have controlled access, wherein the MS users subscribe to the service and pay the corresponding fee to receive the broadcast service. Unsubscribed users are not able to receive the broadcast service. Controlled access may be achieved by encrypting the broadcast transmission/content allowing only the subscribed users to decrypt the content. The MS subscribers are a multicast group.

Throughout this discussion, BC will refer to any of broadcast or multicast communications. While BC is considered a one-to-many communications, there may be any number of transmitters to send the message or communication content.

The following discussion presents a synchronized broadcast transmission in a wireless spread-spectrum transmission system. Traditionally, BC services are provided by multiple base stations to multiple users, wherein each of the BSs transmits a same BC content. A problem exists when a receiver receives the same BC content from multiple BSs. In this case, each BS uses a different waveform, e.g., spreading code, and therefore, each transmission introduces interference to other transmissions. For example, in a Code Division-Multiple Access (CDMA) spread-spectrum system, each base station is identified using a unique code, specifically, a Pseudorandom Noise (PN) code. At the receiver, the transmission from each BS introduces interference into the transmission of another BS, as the PN codes are different and therefore, the waveforms are different.

Presented herein is a synchronized broadcast transmission scheme which provides the same BC content from multiple transmitters using a same waveform or modulation. The BC transmission may be transmitted in a synchronized manner, wherein each transmitter is synchronized with each other. In one embodiment, a synchronized broadcast transmission provides a same spreading code for multiple transmitters and, in this way, the multiple BC transmissions may be treated as different multipath components when received at the receiver. In other words, the synchronized broadcast transmissions create artificial multipath components, wherein the receiver may improve reception quality with using appropriate processing.

An advantage of creating a receiver capable to efficiently receive multipath signals is to allow transmissions from different transmitters to be efficiently received with minimal self interference. For example, a "CDMA equalizer" may be used to compensate for the effective channel response due to multipath while simultaneously attenuating noise and interference.

In one embodiment, for BC transmissions, each transmitter uses a same coding. A specific example in a CDMA system is the use of a common PN code by multiple BSs. In this way, each BS is transmitting the same BC content on identical waveforms. An alternate embodiment employs an Orthogonal Frequency Division Multiplexing (OFDM) waveform for transmission of the BC content. Note, an OFDM transmission may be considered as Discrete Multi-Tone (DMT) Modulation with a trivial spreading code, wherein the spreading code is all ones, etc. Again, the synchronized BC transmission transmits the same BC content on a same waveform.

Not all communication systems support both unicast and multicast, or broadcast, transmissions. In Time Division Multiplexing (TDM), the transmission is divided into time slots, wherein a slot(s) is designated for BC. The BC transmission provided in the BC slot may be transmitted as a synchronized broadcast transmission. In a system supporting a High Rate Packet Data (HRPD) protocol, also referred to as High Data Rate (HDR), as specified in "cdma2000 High Rate Packet Data Air Interface Specification," TLA/EIA/IS-856, the forward link serves one user at a time. While such a system provides a TDM format, users are not assigned predetermined or fixed time slots. The transmitter may change user as well as coding and modulation formats on a per slot basis.

For CDMA BC transmissions in an HRPD system, even though the broadcast content is the same, the actual transmit waveform is not because each sector uniquely spreads the content according to the sector PN sequence. As mentioned hereinabove, one embodiment removes the sector specific PN spreading so that all sectors transmit not only identical BC content but also generate identical transmit waveforms. This allows the receiver to capture all the transmit energy from a desired signal, as opposed to other cell transmissions which then negatively appear as interference terms. According to this embodiment, a common PN code is used by each BS for the BC transmission. In this way, each BS transmits identical BC content using identical waveforms during the BC slot.

In alternate embodiments of a wireless communication system, other synchronized broadcast waveforms may be implemented for the forward link BC slot. The synchronized BC transmission is applicable to other spread-spectrum systems by applying a common spreading code to BC transmissions. Therefore, such methods are not limited to CDMA, OFDM or other specific coding techniques discussed herein.

In application, a controller selects between the synchronized broadcast waveform which enables BC services or the Code Division Multiplexed (CDM) waveform which enables unicast services. The controller is used to implement the synchronized BC transmission, e.g., implement the common spreading code.

The following discussion develops the above-mentioned embodiments by first presenting a broadcast communication system generally including the reasons for obtaining interference in this environment. Next, the HRPD system is introduced specifically. The synchronized BC transmission scheme is developed, including a discussion of how synchronized BC transmission resolves the interference problems. Finally, the discussion addresses how the different methods of synchronized BC transmissions are integrated into a system and how synchronized BC transmissions provide additional benefits such as switching modes between BC and unicast systems.

Note various embodiments are provided throughout this discussion; however, alternate embodiments may incorporate various aspects without departing from the scope of the present invention. Specifically, the present invention is applicable to a data processing system, a wireless communication system, a unidirectional broadcast system, and any other system desiring efficient transmission of information.

Broadcast Communication System

Figure 1:
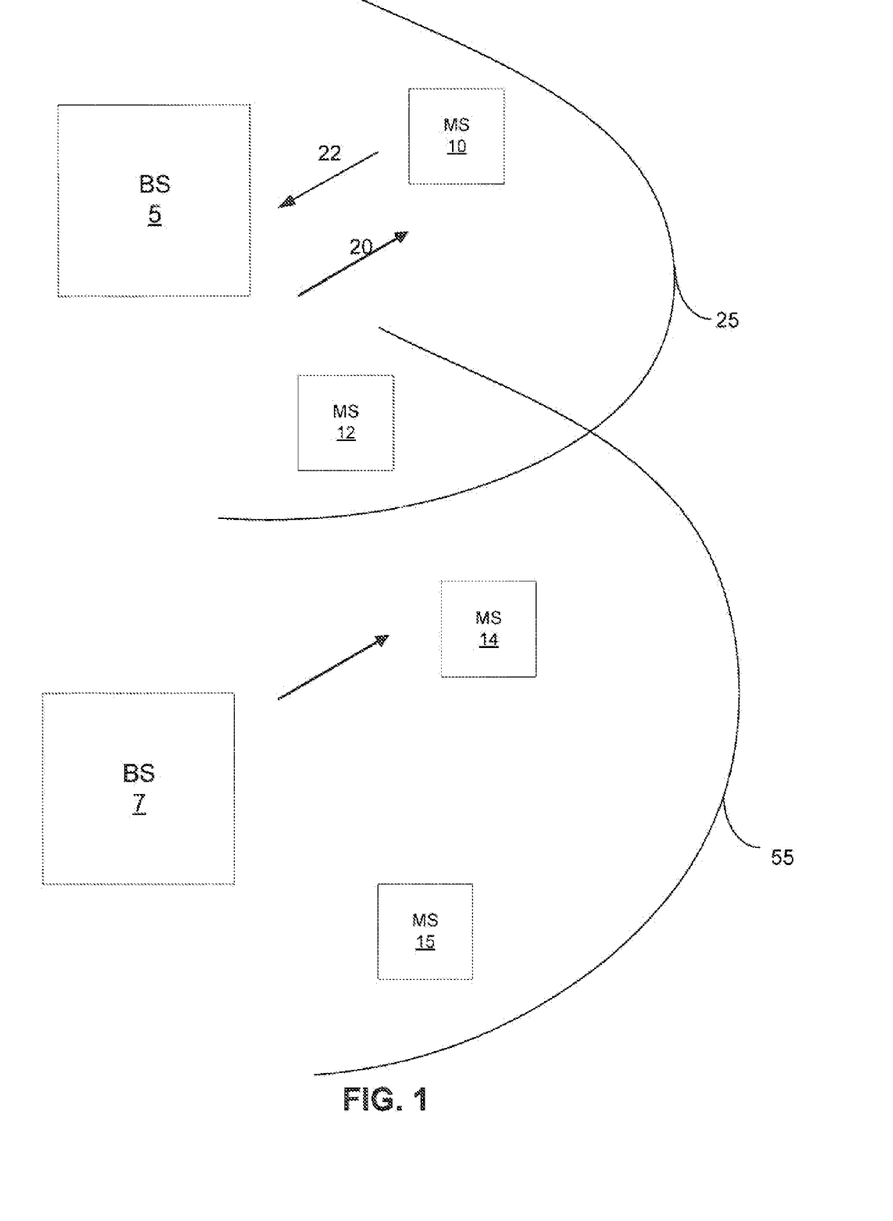
FIG. 1 is a communication system supporting broadcast transmissions.

FIG. 1 illustrates a broadcast system supporting a number of users. The system includes a number of base stations, such as BS 5, 7 supporting communication for a number of mobile stations, such as MS 10, 12, 14, 15. An Access Point (AP) (or an Access Network (AN)) wherein an AN is network equip providing data connectivity between a packet switched data network and Access Terminals (AT). An AP is equivalent to BS. A BS is a wireless network apparatus used for communicating with the mobile stations and may also be referred to as an AP, or some other terminology. Typically, MSs are dispersed throughout the system. A mobile station may also be referred to as an AT, a User Equipment (UE), a remote station, or other wireless communication device. An AT is a device providing data connectivity to a user. An AT may be connected to a computing device such as a laptop personal computer or it may be a self-contained data device such as a personal digital assistant. An AT is equivalent to a MS. The Forward Link (FL) refers to communications from a BS to a MS, such as FL 20 from BS 5 to MS 10. The Reverse Link (RL) refers to communications from a MS to a BS, such as RL 22 from MS 10 to BS 5. Each MS 10 may receive transmissions from one or more BSs, such as from BS 5 and from BS 7; each MS 10 may transmit to one or more BSs, such as to BS 5 and to BS 7, at any given moment. The actual transmission scenario depends on MS 10 activity, soft handoff capability, etc.

Broadcast services provide point-to-multipoint communication service in a wireless communication system between at least one BS and a plurality of MS, such as from BS 5 to MS 10 and 12 that receive the broadcast content within the communication coverage area 25 of the base station 5. The broadcast content transmitted by the base station 5 to the plurality of mobile stations 10 and 12 via FL 20, may include, but need not be limited to, news, movies, sporting events, and the like. The broadcast content is typically generated by a content server and is broadcast at a single data rate over a broadcast channel of the FL to the MSs 10 and 15 within its coverage area 25. Note, BS 7 may operate similarly. BS 7 has a coverage area 55. Note, MS 12 is within coverage area 25 and 55; and therefore, may communicate with BS 5 and BS 7.

In one embodiment, broadcast is the transmission of data, i.e., BC content, to all BC subscribers in a designated broadcast area, which may be a single sector or multiple sectors. Since a broadcast transmission is intended to be received by multiple users located within the broadcast area, the broadcast data rate is normally determined by the channel conditions of the worst-case user in the broadcast area. For a CDMA system, the worst-case user is typically located at the edge of a sector and has a low carrier-to-total-interference-and-noise ratio (C/I), where interference and noise power is typically dominated by interference from other sectors.

Figure 2:
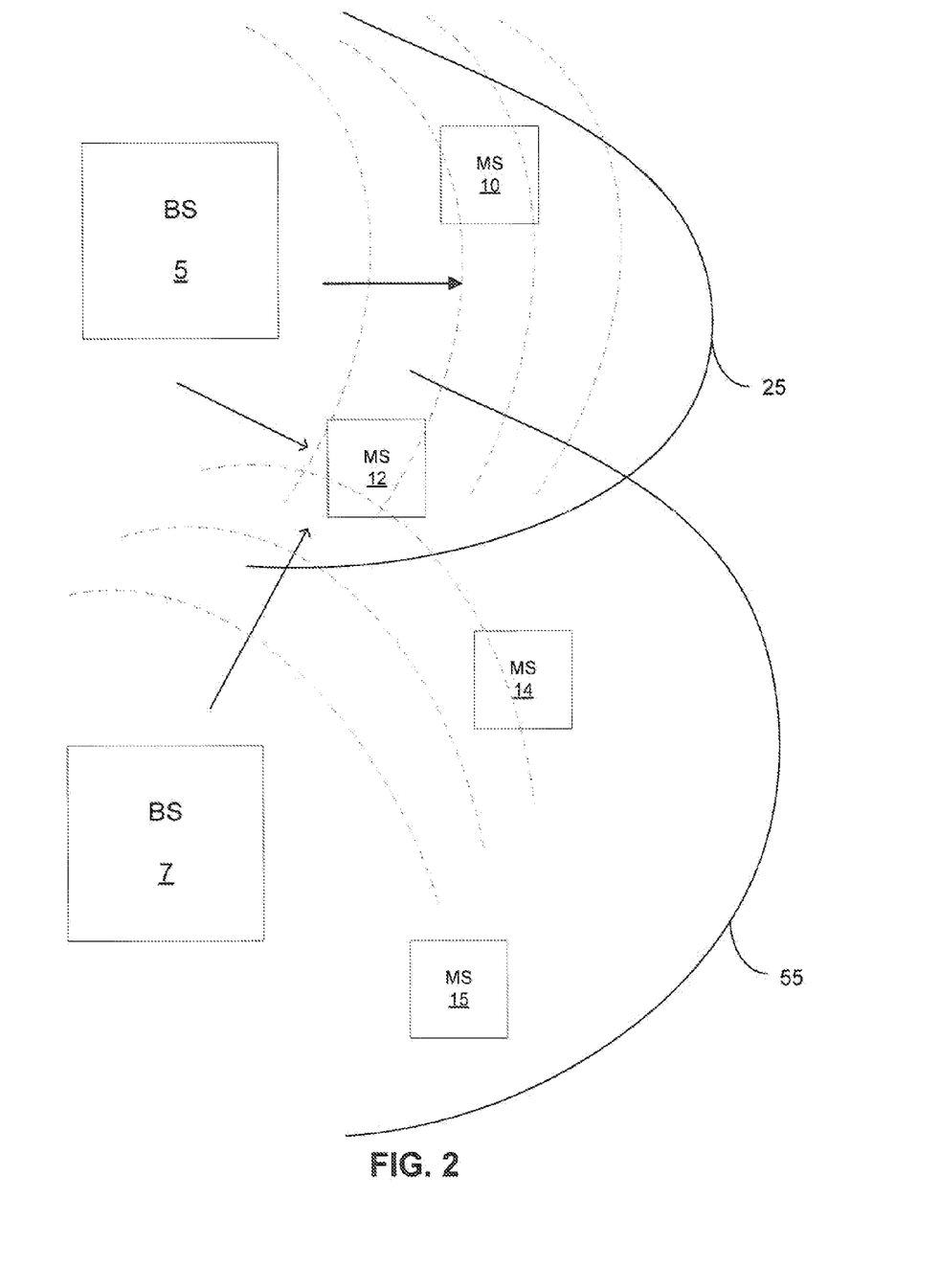
FIG. 2 is a communication system supporting broadcast transmissions and showing interference between the transmissions.
Figure 3:
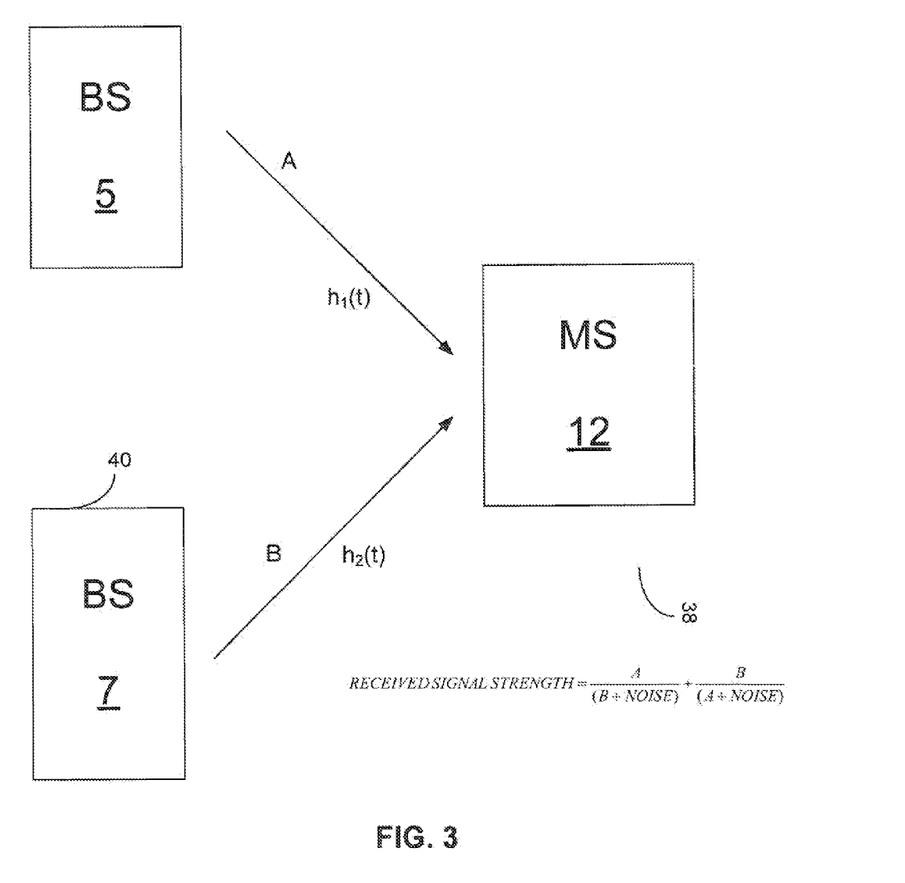
FIG. 3 is a communication system supporting broadcast transmissions and showing the calculation of interference between the transmissions.

Although CDMA systems describe significant improvements from previous systems, interference may still occur during soft handoff between BS 5 and BS 7 as illustrated in FIG. 2. Users at the edge of a sector require large amounts of transmit power to communicate with distant BSs and typically cause a disproportionate amount of inter-sector interference. Thus removing this interference may provide a big advantage for all users. The C/I from BS 5 is limited by the interference from BS 7, and vice-versa. Therefore, as demonstrated in FIG. 3, the channel condition from BS 5 to MS 12 may be modeled by the impulse response $h_1(t)$, wherein the signal strength is given as A. The channel condition from BS 7 to MS 12 may be modeled by the impulse response $h_2(t)$, wherein the signal strength is given as B. The performance of the transmission, as received by MS 12, may then be defined as:

$$\text{RECEIVED SIGNAL STRENGTH} = \frac{A}{(B+\text{NOISE})} + \frac{B}{(A+\text{NOISE})}, \quad (1)$$

wherein the received signals are combined at the MS. The signal A received from BS 5 introduces interference to the signal B transmitted from BS 7 (vice-versa). Thus, the interference introduced by the multiple transmissions creates interference affecting signal quality at MS 12.

Figure 4:
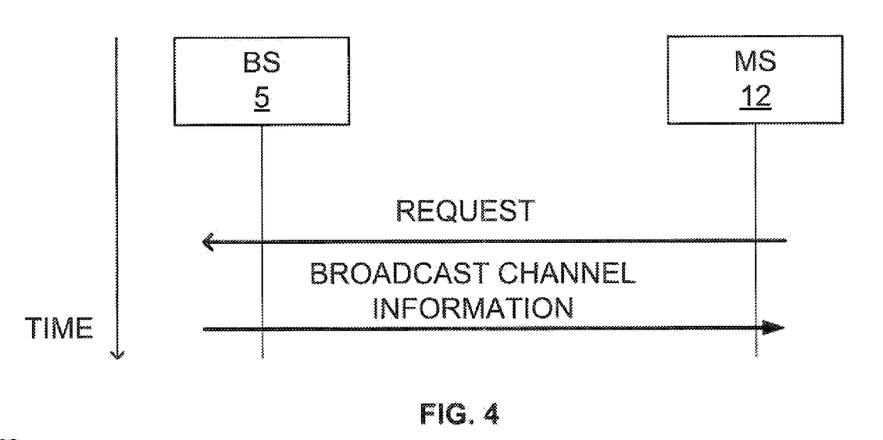
FIG. 4 is a timing diagram illustrating the broadcast negotiation between a Base Station and a Mobile Station.

Referring to FIG. 4, BC services may include MS 12 receiving from BC content the BS 5; BC content may include but is not limited to, video, audio broadcast or data, for example, software upgrades or application files. In another example, the weather or traffic information may be broadcast to mobile station 12. In a broadcast system, the same signal may be sent simultaneously to a large number of mobile stations. The broadcast signal may be encrypted. Therefore, the mobile station 12 may need to subscribe to such services. The mobile station 12 may need to obtain encryption information from the base station 5, before receiving the services. In addition, the mobile station 12 may need to receive other broadcast parameters in order to receive the broadcast services. The broadcast parameters may include the broadcast channel identifier, broadcast modulation format information, data rate information, encryption key information, coding information, broadcast channel frequency information, encryption and decryption keys information, header compression information, and other information. The broadcast services may also be controlled by a broadcast controller, not shown in FIG. 4, wherein the broadcast controller provides the broadcast programming, transmission, and control of the broadcast services.

High Rate Packet Data

HRPD technology offers high speed, high capacity packet data services, wherein data is transmitted at full power to a given user per slot on the forward link. In such a system, each MS measures the channel quality at each time slot, such as to measure C/I of all measurable pilot channels 55. The MS selects the BS having the best channel quality, and requests data transmissions at a specific rate from that BS. The data request is transmitted as a Data Rate Control (DRC) message. Note, the requested rate is typically the maximum supportable at the present channel quality. The BS may be in communication with multiple MSs, and therefore, the BS selects a MS for transmission on each slot. This allows the BS to operate at full power and transmit data at the highest data rate each AT requests.

Figure 5:
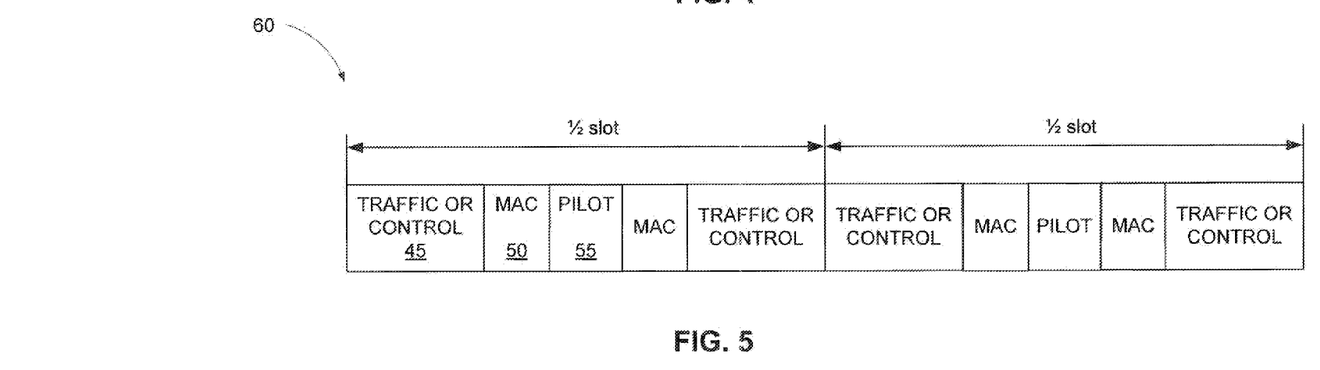
FIG. 5 is a spread-spectrum communication system Forward Link structure implementing a time division format.

FIG. 5 illustrates an HRPD link time slot structure. Time slot 60 is illustrated. Time slot 60 has 2 portions, wherein each ½ time slot has channel assignments for the following time-multiplexed channels: pilot channel 55, forward Medium Access Control (MAC) channel 50, and the forward traffic channel or control channel 45. The traffic channel 45 carries user data packets. The control channel 45 carries control messages, and may also carry user traffic. The MAC channel 50 defines the procedures used to receive and transmit over the physical layer, which provides the channel structure, frequency, power output, modulation, and encoding specifications for the forward and reverse link channels. The pilot channel 55 allows the AT such as in MS 10 to obtain a rapid and accurate C/I estimate. Within each transmitting slot 60, the pilot channel 55, the MAC channel 50, and the traffic and control channels 45 are time-multiplexed. All time-division multiplexed channels are transmitted at the maximum power of the sector. When there is no traffic on traffic channel 45, an idle slot is sent, wherein an idle slot includes pilot channel 55 and MAC channel 50. Transmission of idle slots decreases interference to other cells on the FL.

Synchronized Broadcast

Figure 6:
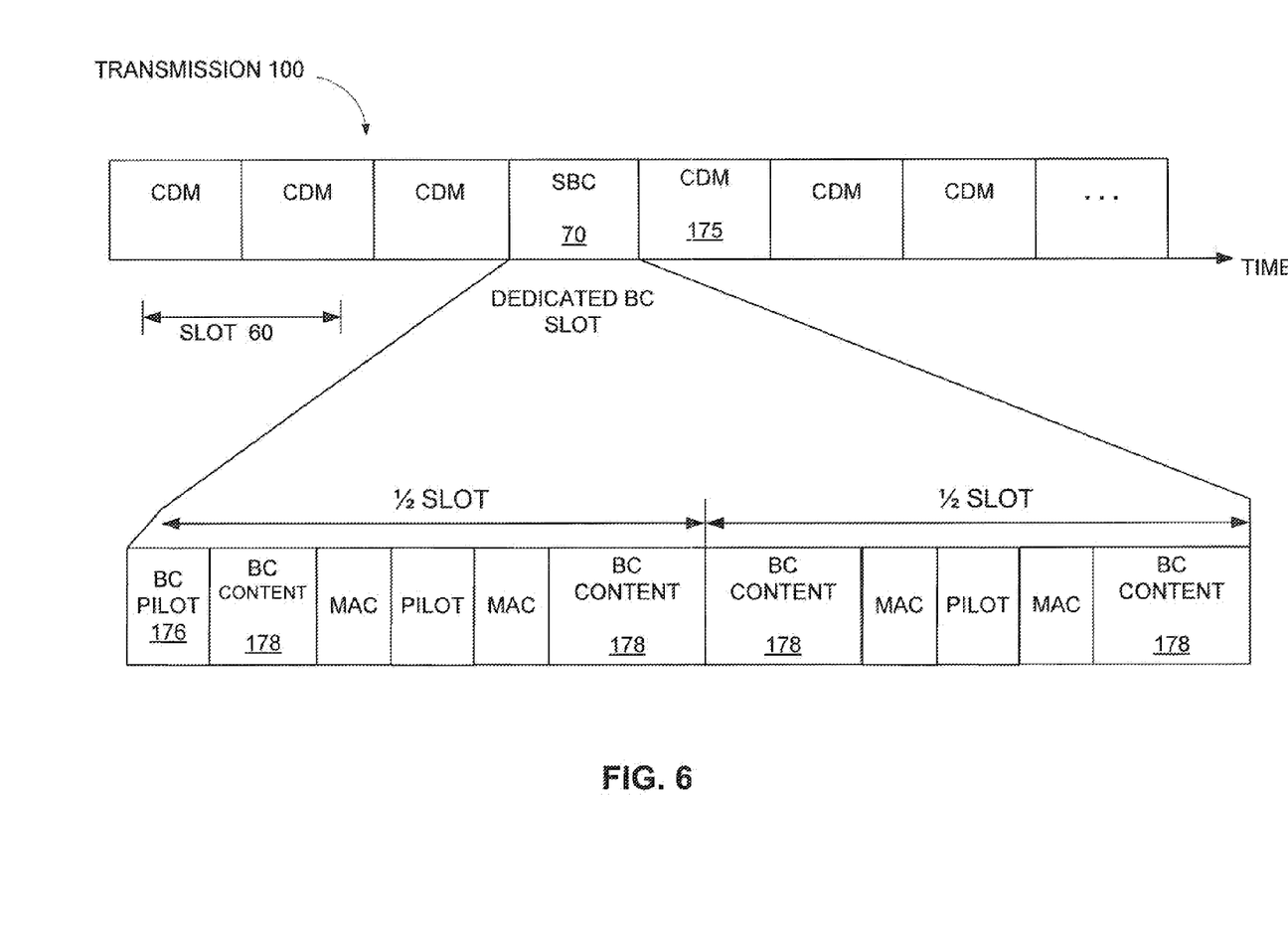
FIG. 6 is a Forward Link transmission format for a synchronized broadcast transmission.

Synchronized BC refers to transmission of a same BC content by multiple transmitters using a same waveform, e.g., same spreading code. As illustrated in FIG. 6, in a system supporting HRPD, such as "1× Evolution-Data Optimized" referred to as 1×EV-DO, synchronized BC may be implemented in the designated BC slot of the FL transmission 100, having multiple time slots. Here the BC slot is designated as Synchronized BC (SBC). Traffic is transmitted in a CDM format in traffic slots 175, while BC is transmitted as SBC in slot 170. The SBC provides for a same BC content to be transmitted as a same waveform. In the present embodiments, a same spreading code is used by multiple base stations transmitting the BC content. Note, alternate systems may employ other modulation and coding in traffic slots 175.

The BC slot employing SBC is further detailed as including a BC pilot 176 and BC content 178. The BC pilot 176 provides a reference for the receiver. When the receiver employs an equalizer, the BC pilot 176 provides a reference for training the equalizer for use in receipt of BC transmission 100. In one embodiment, a same equalizer is used for receiving traffic and BC transmissions. In one embodiment, the BC transmission applies a broadcast PN code to the broadcast transmissions, and in such embodiment, the equalizer is used to estimate the received broadcast transmission. In an embodiment employing an OFDM waveform for the transmission of broadcast content, no equalizer is used for broadcast, while an equalizer may be used for the code division multiplexed transmission. In an alternate embodiment, a same equalizer is used with different configurations for traffic and BC transmissions, wherein configuration refers to the number of taps used as well as the adjustment of filtering coefficients. In still another embodiment, separate equalizers are used, one for traffic and one for BC transmissions. Linear equalizers may use the BC pilot for training, wherein the receiver may implement a multi-pass/multi-step Least Mean Squares (LMS) type training, or may implement Least Squares or Recursive Least Squares (RLS) type training. Alternately, the equalizer coefficients may be calculated directly based on a channel estimate derived from the BC pilot 176. The BC pilot 176 may increase overhead per slot.

According to one embodiment, synchronized BC transmissions provide for each BS to transmit identical physical layer packets during an interlace set aside for broadcast. Interlace refers to the non-sequential transmission and/or processing of sequential content, including but not limited to BC content, wherein the portions or interlaces are reordered and combined to display the BC content.

The receiver of the synchronized BC transmissions then demodulates the transmissions from all servers by applying an equalizer to "invert" the composite channel response. In other words, the receiver uses the equalizer to undo the filtering caused by the composite channel response.

Note implementation of synchronized BC transmissions may be achieved with minimal changes to existing networks and devices. Specifically, the embodiments provided herein present changes to the modulation format and inner code for a BC physical layer packet. This does not impact other transmission protocols, including, but not limited to, MAC protocols.

a) Common Spreading Code: Example, Common PN Code

Synchronized BC transmissions overcome the interference otherwise introduced by multiple concurrent BC transmissions. In a spread-spectrum system, such as a CDMA system, each BS applies a unique spreading code, such as a PN code. This results in the transmission of different waveforms from each BS. Synchronized BC provides a BC transmission scheme having approximately identical waveforms for BC transmission. The identical waveforms create an artificial multipath producing a frequency-selective composite channel response at the receiver. The receiver processes the signal by inverting or undoing the filtering effect of the composite channel response, by using an equalizer. This method of processing minimizes the effect of mutual interference introduced by BC transmissions from multiples BSs.

In one embodiment, multiple transmitters use a same PN code to spread the broadcast physical layer packet. During this interlace, the effective channel response at the MS is the sum of the individual channels from each BS. The effective channel may have a large delay spread characterized by the propagation delay (and attenuation) from distant BSs to the MS. If the receiver is able to "invert" or undo the filtering of the effective channel, then transmissions from other BSs may no longer act as interference. In this case the interference and noise seen at the MS is due to thermal noise and receiver distortions such as quantization noise, phase-noise, etc.

According to one embodiment, consistent with a system supporting the HRPD protocol, broadcast transmissions from multiple BSs are time-synchronized with each other. In this way, the transmitters transmit the same BC content using a same spreading code at the same time. The time-synchronization is particularly advantageous when the synchronized BC transmission employs OFDM for the broadcast portion of a CDM transmission. In an OFDM transmission, the choice of carrier spacing ensures orthogonality of carriers. To compensate for multipath delay, the cyclic prefix is designed to be greater than the delay spread, providing a guard band to the OFDM symbol to ensure orthogonality between carriers in the frequency domain. If the delay spread (time delay between the longest and earliest channel path) is too great, the subcarriers will overlap in the frequency domain, and thus orthogonality will be lost. If the BS transmissions are not time-synchronized, differences in timing will effectively become multipath delays, increasing the delay spread. Therefore, time-synchronized transmissions from the multiple BSs serve to align the OFDM transmissions avoiding the introduction of additional delay spread.

Figure 7:
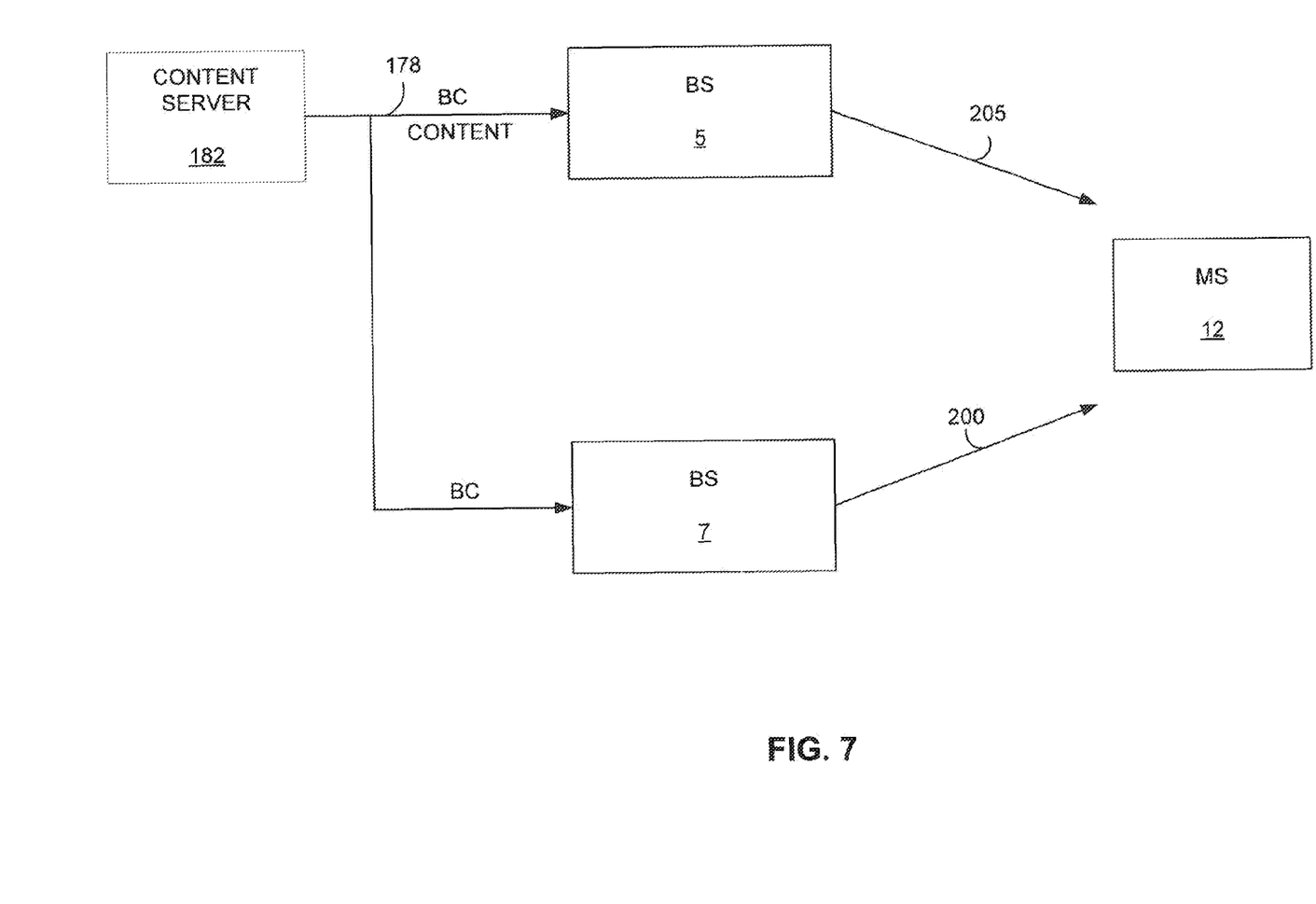
FIG. 7 is a broadcast communication system showing one technique of synchronized broadcast where each Base Station applies the same specific Pseudorandom Noise (PN) code.

FIG. 7 illustrates a system implementing synchronized BC transmissions, wherein a common spreading code, e.g., PN code, is used by multiple BSs. The content server 182 provides the BC content 178 to BS 5 and BS 7. Each BS 5 and 7 then applies a common PN code. BS 5 transmits waveform 205 and BS 7 transmits waveforms 200. The common PN code may be referred to as a BC PN code or a BC spreading code. That is, because PN of waveform 200 is the same as the PN code of waveform 205. The same waveform is transmitted from each BS 5 and 7 to MS 12. Therefore, the receiver at MS 12 views the identical waveforms 200 and 205 as multipath versions of a same signal, i.e., as if there were transmitted from one transmitter, or BS.

Figure 8:
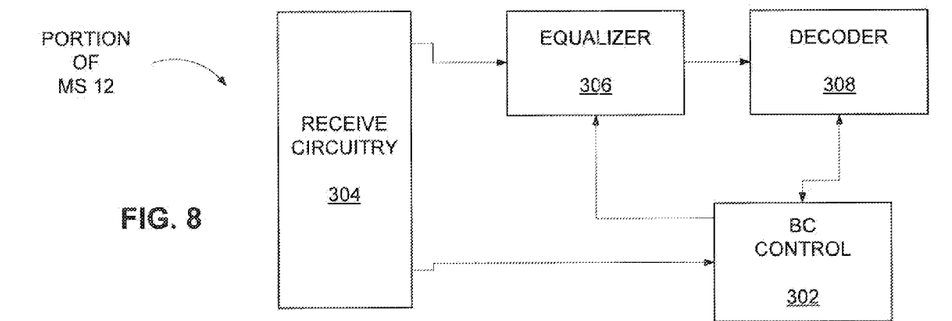
FIG. 8 is a wireless receiver adapted for processing synchronized broadcast transmissions, having an equalizer.

FIG. 8 illustrates a MS 12 receiver supporting synchronized BC transmissions. The MS 12 includes receive circuitry 304, which receives the analog waveform, down-converts, filters and samples the received waveform, providing the resulting samples to equalizer 306. Equalizer 306 corrects for signal distortions and other noise and interference introduced by the channel. The equalizer 306 outputs estimates of the transmitted symbol to a decoder 308 to determine the original information bits. The equalizer 306 is also coupled to a BC controller 302. The BC controller 302 provides information to equalizer 306, wherein the information is specific to the synchronized BC transmission. The BC controller 302 identifies the BC pilot 176 and instructs the equalizer 306 to train on the BC pilot 176 for BC transmissions, such as BC transmission 100. The BC controller 302 may also maintain the BC content 178 in an interim memory storage unit (not shown).

Figure 9:
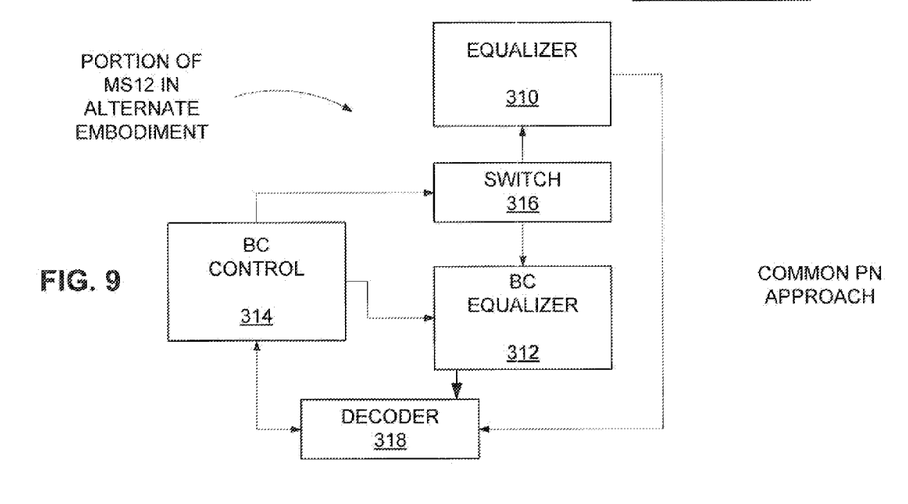
FIG. 9 is a wireless receiver having an equalizer designated for processing synchronized broadcast transmissions.

FIG. 9 illustrates one embodiment, wherein a separate equalizer is assigned to BC transmissions. In this case, the MS 12 includes equalizer 310, used for traffic and other non-BC transmissions, and BC equalizer 312 used for synchronized BC transmissions. A BC controller 314 identifies the BC pilot 176 and provides instructions for training, etc. to BC equalizer 312, as well as information to the switch 316 for switching between a synchronized BC mode (for processing synchronized BC transmissions) and a non-SBC mode (for processing other transmissions). Outputs of equalizer 310 and BC equalizer 312 are provided to decoder 318, which is also bi-directionally coupled to BC control unit 314.

b) Orthogonal Frequency Division Multiplexing (OFDM)

OFDM is a spread-spectrum technique wherein data is distributed over a large number of sub-carriers, and the sub-carriers are spaced apart at precise frequencies. The spacing provides "orthogonality" between the tones, that is, the detector of a given tone is not affected by the energy in the other tones. With OFDM, each sub-carrier (or equivalently, frequency tone or frequency bin) may be modulated with data.

Figure 10:
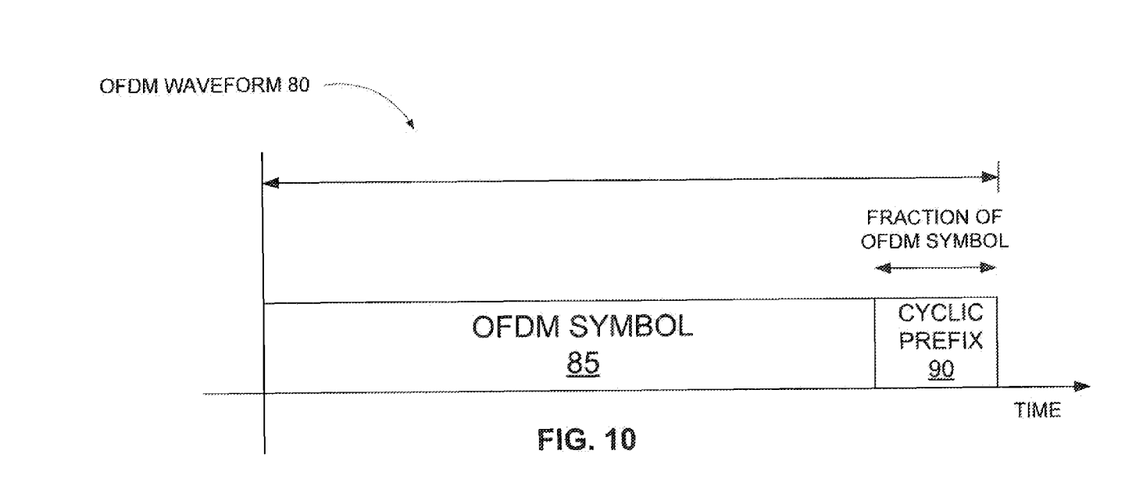
FIG. 10 is an Orthogonal Frequency Division Modulation symbol.

A cyclic prefix of a fixed length is appended to each OFDM symbol to turn the linear convolution of the channel into a "circular convolution". FIG. 10 illustrates OFDM waveform 80 having an OFDM symbol 85 with a cyclic prefix 90. Ideally, the OFDM symbol length is large with respect to the cyclic prefix length to reduce overhead as far as possible. A fundamental trade-off is incurred as the cyclic prefix 90 must be long enough to account for the anticipated multipath delay spread experienced by the system. In other words, the cyclic prefix length should be "longer" than the length of the effective impulse response seen at the receiver. In a design using an existing FL structure, such as illustrated in FIGS. 5 and 6, having pilot and MAC bursts length of the OFDM symbol 85 and cyclic prefix 90 is limited to the longest contiguous block available.

Figure 11:
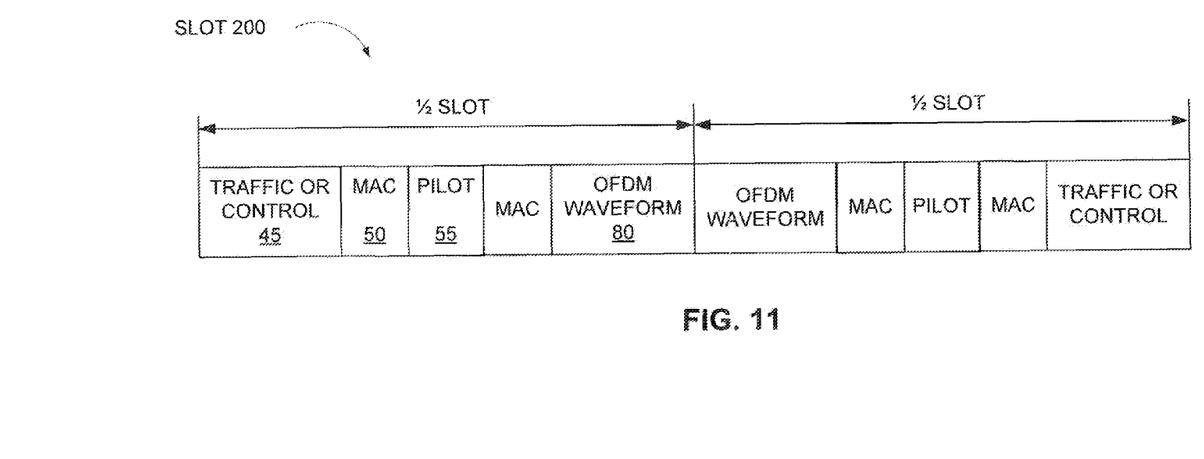
FIG. 11 is a Forward Link transmission format for a synchronized Orthogonal Frequency Division Modulation broadcast transmission.

FIG. 11 illustrates a synchronized BC transmission FL format (slot 200) using OFDM for BC. The OFDM waveform 80 provides the BC content during the BC portion of slot 200, similar to slot 60. By keeping the pilot channel 55 and MAC channel 50 in FIG. 11 intact, the system provides the same compatibility with older mobile terminals. One embodiment for implementing OFDM for synchronized BC transmissions, illustrated in FIG. 12, includes a CDM modulation path and an OFDM modulation path. Note, the format of slot 200 is similar to slot 60 of FIG. 5, wherein slot 200 now includes OFDM waveform 80 in place of a traffic or control channel 45.

As mentioned above, OFDM is a modulation technique wherein user data is modulated onto the tones. The information is modulated onto a tone by adjusting the tone's amplitude and/or phase. In the basic form, a tone may be present or disabled to indicate a one or zero bit of information, and, either Phase Shift Keying (PSK) or Quadrature Amplitude Modulation (QAM) is typically employed. An OFDM system takes a data stream and splits it into N parallel data streams, each at a rate 1/N of the original rate. Each stream is then mapped to a tone at a unique frequency, and these tones are referred to as "data tones." Concurrently, known "pilot symbols" are transmitted on a different set of tones referred to as "pilot tones." These pilot tones may be used by the receiver to estimate the composite channel's frequency response, and to perform demodulation of the received OFDM signal. The pilot tones and data tones are combined together using the Inverse Fast Fourier Transform (IFFT) to yield a time-domain waveform to be transmitted.

Figure 12:
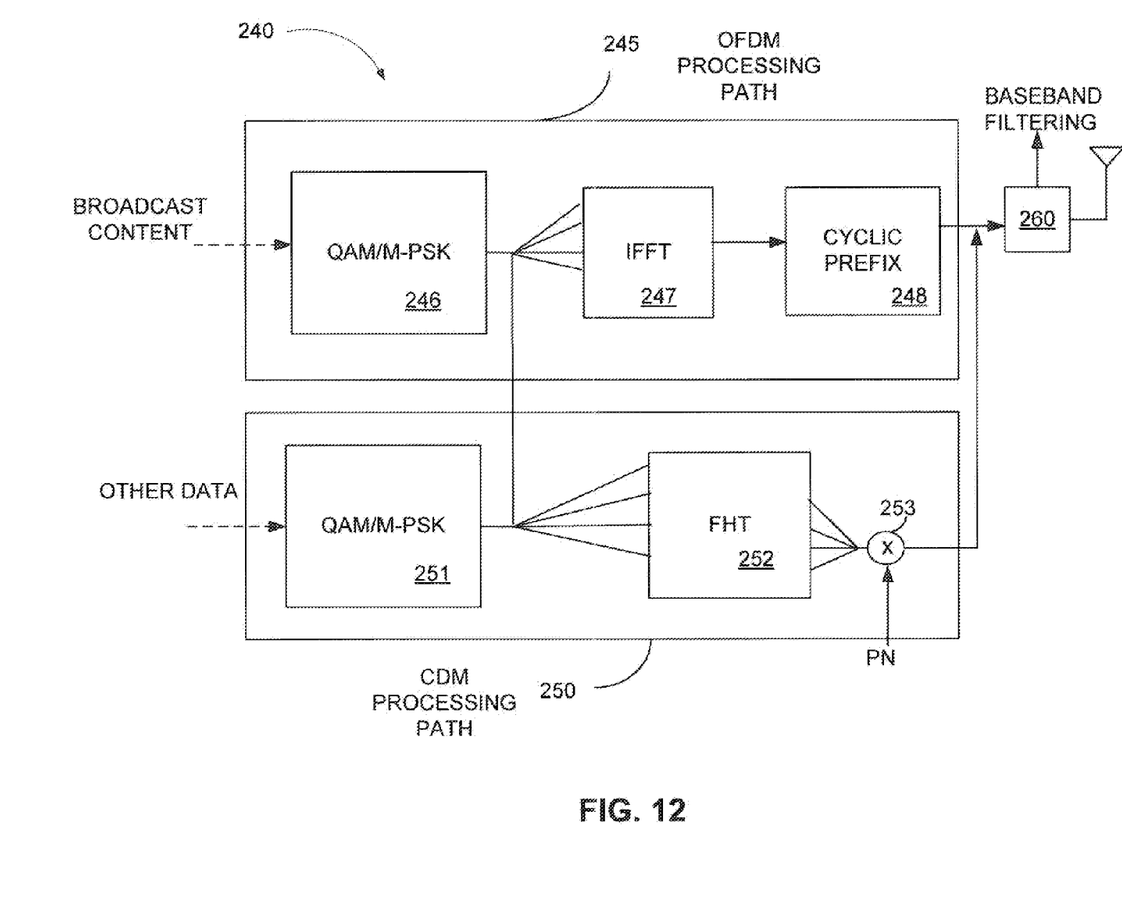
FIG. 12 is a transmitter adapted for spread-spectrum communications and supporting synchronized broadcast, having an Orthogonal Frequency Division Modulation processing path and a Code Division Modulation processing path.

FIG. 12 illustrates transmitter processing blocks in transmitter 240 according to one embodiment supporting both CDM and OFDM processing of FL transmissions, wherein OFDM is applied to BC transmissions. The transmitter 240 includes a CDM processing path 250 and an OFDM processing path 245. The CDM processing path includes modulation unit 251, Fast Hadamard Transform (FHT) processing unit 252, and PN coding unit 253. The OFDM processing path 245 includes modulation unit 246, Inverse Fast Fourier Transform (IFFT) processing unit 247, and cyclic prefix application unit 248. For both paths, modulation is designated as Quadrature Amplitude Modulation (QAM). The outputs of cyclic prefix application unit 248 and PN coding unit 253 are provided to transmit circuitry 260, which prepared the RF signals. Alternate embodiments may employ alternate modulation and transform processing, and may include other steps not specifically illustrated in the example given in FIG. 12.

Figure 13:
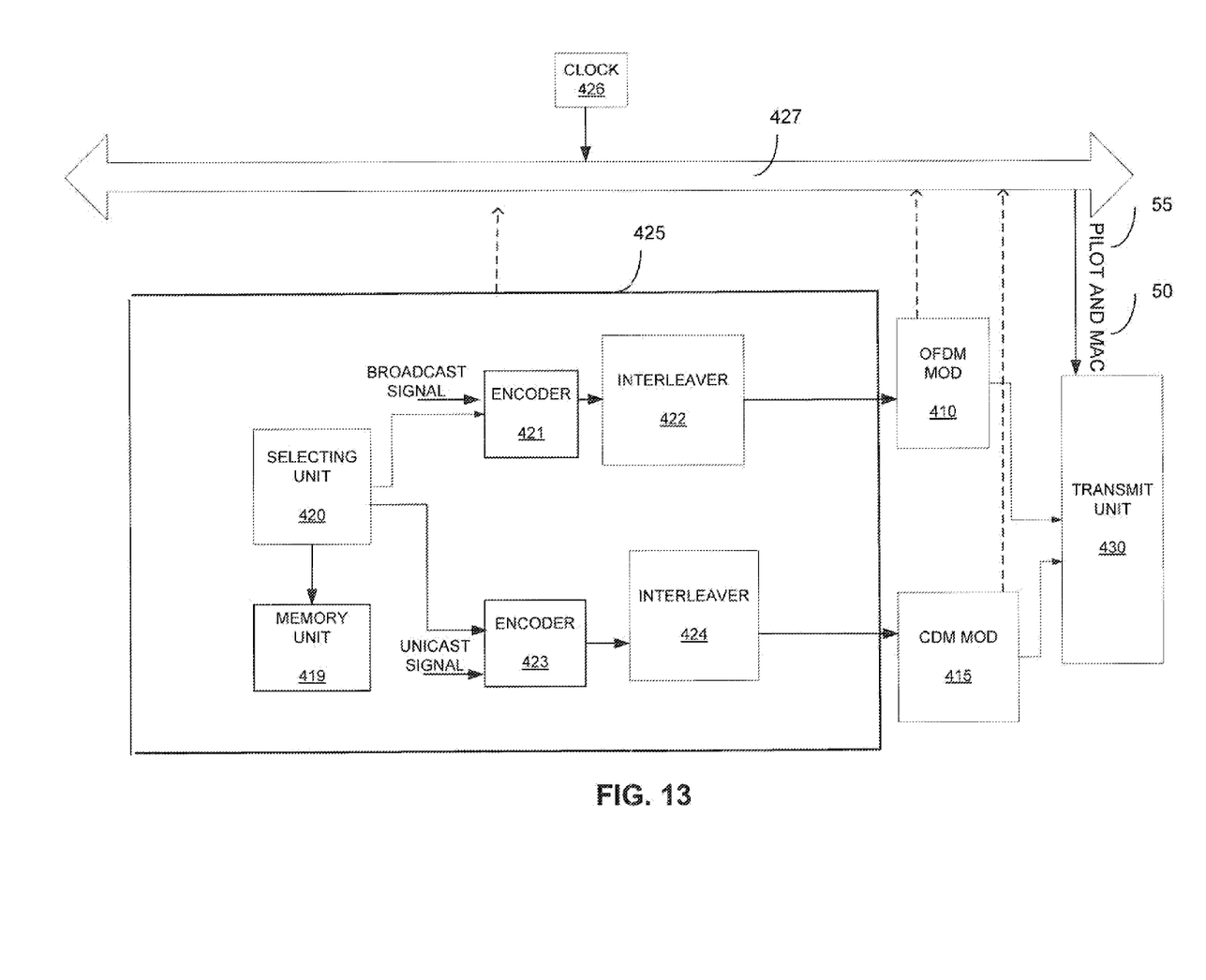
FIG. 13 is a transmitter adapted for spread-spectrum communications, supporting synchronized broadcast, and adapted to select between an Orthogonal Frequency Division Modulation processing path and a Code Division Modulation processing path.

The processing paths of FIG. 12 may be implemented in a transmitter as illustrated in FIG. 13. Modulation controller 425 activates the OFDM modulator 410 or the CDM modulator 415 depending on transmission content: BC or Non-BC, e.g. unicast. A communication bus 427 facilitates information flow to the various modules within the transmitter. Receive circuitry (not shown) receives signals over the air interface from ATs. The transmitter also includes processing elements (not shown) for processing received signals. The transmitter also receives information from infrastructure elements within the system, including packet data information from the broadcast content server (not shown).

Initially, the OFDM modulator 410 is running and broadcasting information such as news, movies or sporting events. Then, as shown in FIG. 4, the mobile station 12 may send a request to the base station 5 to watch a particular channel at a particular frequency. If all conditions have been met, such as the mobile station having a valid subscription, then the base station 5 sends a message to the mobile station 12 with information regarding the broadcasting channel and its frequency.

A selecting unit 420 will activate encoder 421 if the user selects broadcast services. Memory unit 419 will simultaneously receive instructions to select from selecting unit 420 and will store this information. When encoder 421 is activated, it will encode the broadcast signal to be transmitted. Encoding consists of source encoding and channel encoding. The source information has to be coded into a digital format in order for it to be further processed by the digital communication system. After the source information is coded into a digital form, redundancy needs to be added to this digital baseband signal. This process, known as channel encoding, is done to improve performance of the communication system by enabling the signal to better withstand the effects of channel impairments, such as noise and fading.

After the broadcast signal is encoded by encoder 421, it will then be interleaved by interleaver 422. Signals traveling through a mobile communication channel are susceptible to fading. Error-correcting codes are designed to combat errors resulting from fades and, at the same time, keep the signal power at a reasonable level. Most error-correcting codes perform well in correcting random errors. However, during periods of deep fades, long streams of successive burst errors may render the error-correcting function useless. Interleaver 422 will perform a technique for randomizing the bits in a message stream so that burst errors introduced by the channel can be converted to random errors.

The OFDM modulator 410 will then modulate the signal received from interleaver 422. The digital bit stream has to be modulated onto a radio-frequency (RF) carrier in order for it to be transmitted. The modulated signal is then transmitted in the form of a propagating Electro-Magnetic (EM) field, to transmit unit 430.

The transmitting unit 430 will then transmit the signal to the mobile station 12 at the particular frequency suggested by the modulator. As compared to conventional systems, the modulation controller 425 supports an added data rate or waveform in addition to a conventional set of modulations; and the modulation controller 425 synthesizes a series of sine wave tones. Because of its ease in processing, the OFDM modulator 410 may be implemented using Digital Signal Processing (DSP) software.

The selecting unit 420 may also activate encoder 423 if the user selects unicast services. Memory unit 419 will simultaneously receive instructions to select from selecting unit 420 and will store this information. When encoder 423 is activated, it will encode the unicast signal to be transmitted. Encoder 423 might use the same or different encoding scheme as encoder 421.

After the unicast signal is encoded by encoder 423, it will then be interleaved by interleaver 424. Interleaver 424 will use the same or different interleaving technique than interleaver 422.

The CDM modulator 415 will then modulate the signal received from interleaver 424. The CDM modulator 415 will use a different modulation scheme than the OFDM modulator

410. The modulated signal is then transmitted to transmitting unit 430, which will transmit the CDM signal to the mobile station at the particular frequency suggested by the modulator. The clock 426 and clock 526 (FIG. 14) may be used to time-synchronize transmissions with other transmitters in the system. Such time-synchronization is advantageous in aligning synchronized broadcast transmissions, such as for OFDM waveforms.

Figure 14:
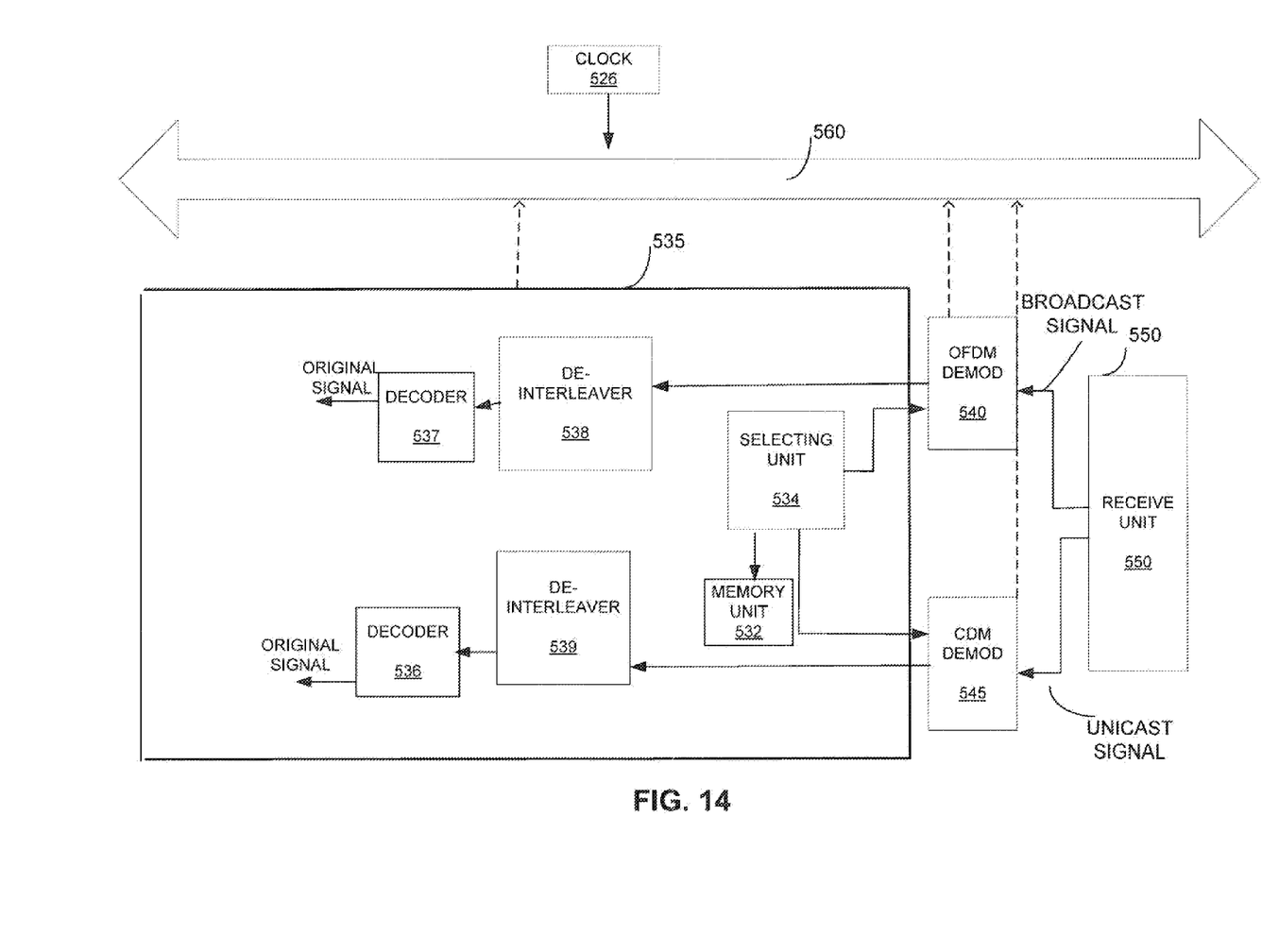
FIG. 14 is a receiver adapted for spread-spectrum communications, supporting synchronized broadcast, and having an Orthogonal Frequency Division Modulation processing path and a Code Division Modulation processing path.

In the mobile station of FIG. 14, a demodulation controller 535 is capable of activating the OFDM demodulator 540 or the CDM demodulator 545 depending on the modulation of the received signal.

The various components of demodulation controller 535 are described in FIG. 14. A selecting unit 534 activates the OFDM demodulator 540 if the signal received by the receiving unit 550 was a broadcast signal. Memory unit 532 will simultaneously receive instructions to select from selecting unit 530 and will store this information. When the OFDM demodulator 540 is activated, it will proceed to demodulate the broadcast signal. The demodulated signal is then transmitted to deinterleaver 538, which reconstructs the message using the same bit scheme as interleaver 422. Deinterleaver 538 will then transmit the reconstructed message to decoder 537, which will decode the message into the original signal.

A communication bus 560 facilitates information flow to the various modules within the receiver. Transmit circuitry (not shown) transmits signals over the air interface to the AN. The receiver also provides the original signal information to processing elements within the receiver (not shown) via the communication bus 560.

The selecting unit 534 may also activate the CDM demodulator 545 if the signal received by receiving unit 550 was a unicast signal. Memory unit 532 will simultaneously receive instructions to select from selecting unit 534 and will store this information. When the CDM demodulator 545 is activated, it will proceed to demodulate the unicast signal. The CDM demodulator 545 will use a different demodulation scheme than OFDM demodulator 540. The demodulated signal is then transmitted to deinterleaver 139, which reconstructs the message using the same bit scheme as interleaver 524. Deinterleaver 539 might use the same or different deinterleaving technique than deinterleaver 538. Deinterleaver 539 will then transmit the reconstructed message to decoder 536, which will decode the message into the original analog signal. Decoder 536 may use the same or different decoding scheme than decoder 537.

OFDM provides improved performance for transmission of BC, however, OFDM may introduce increased complexity or higher transmitter and/or receiver demands. The techniques described herein may be implemented by various means. As mentioned in the previous section, the waveforms for broadcast are not necessarily OFDM as other devices may be configured to accomplish the same function.

As mentioned above, for the embodiment which uses the technique of applying the same PN code, the SYNC BC 170 of FIG. 6 is implemented in the transmission slot 200 as illustrated in FIG. 11. The modulation process more specifically adapted for this system may be described by FIG. 13. The OFDM modulator 410 may be replaced with the OFDM processing path 245 in FIG. 12. Similarly, the CDM modulator 415 may be replaced with the CDM processing path in FIG. 12.

c) Alternate Sources of Synchronized Broadcast Waveforms

In alternate embodiments of a wireless communication system, other synchronized broadcast waveforms may be implemented into the forward link transmitting slot of a channel, by removing the above-mentioned traffic portion of the slot. These waveforms will provide alternate modulation schemes. Application of a common spreading code creates artificial multipath which provides improved performance in BC transmissions.

Synchronized BC improves performance of BC transmissions and thus increases the data throughput thereof. Synchronized BC as detailed herein provides for transmission of a same BC content using a same waveform. In a spread-spectrum system dividing the FL into time slots, the synchronized BC may be used on a per slot basis. The synchronized BC effectively provides an artificial multipath, which may be resolved at the receiver in manners similar to those used for multipath. In soft handoff, when the receiver is receiving BC transmissions from multiple transmitters, the received synchronized BC signals are viewed as multipath. In one embodiment, the synchronized BC is provided as an OFDM signal, wherein the receiver receives multiple copies of the same waveform and processes such signals using an OFDM receiver. Other modulation and waveform formats may be implemented, wherein multiple transmitters apply a same spreading-code to transmit a same BC content. In another embodiment, a common PN code or BC PN code is applied to multiple transmitters, wherein the receiver anticipates such spreading and is able to resolve the various signals using an equalization method. An equalizer may be reused for use in BC transmissions, wherein the equalizer is trained on a BC pilot. An alternate embodiment may employ a separate equalizer for BC transmissions. Still other embodiments may reconfigure an equalizer for the various scenarios, including BC equalization.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   spreading, at a base station, non-broadcast content in a first time slot of a transmission with a first spreading code specific to a transmitter of the base station;
   spreading broadcast content in a second time slot adjacent to the first time slot in the transmission with a broadcast spreading code common to the transmitter of the base station and at least one other transmitter; and
   time-synchronizing with the at least one other transmitter the transmission of the broadcast content spread with the broadcast spreading code common to the transmitter of the base station and the at least one other transmitter.

2. The method of claim 1, wherein the non-broadcast content includes a plurality of code division modulated slots and wherein the broadcast content includes at least one synchronized broadcast slot.

3. The method of claim 2, further comprising:
   modulating prior to spreading the non-broadcast content using code division modulation, wherein the modulated and spread non-broadcast content is transmitted in the plurality of code division modulated slots; and
   modulating the broadcast content using orthogonal frequency division modulation, wherein the modulated and spread broadcast content is transmitted in the at least one synchronized broadcast slot.

4. The method of claim 1, wherein spreading the broadcast content comprises spreading the broadcast content using a waveform common to the transmitter and the at least one other transmitter.

5. A receiver comprising:
   means for receiving a transmission from a base station, wherein a first time slot of the transmission includes non-broadcast content and wherein a second time slot adjacent to the first time slot of the transmission includes synchronized broadcast content; and
   means for decoding the transmission, wherein the non-broadcast content is decoded using a first spreading code specific to a transmitter of the base station and wherein the synchronized broadcast content is decoded using a broadcast spreading code common to the transmitter of the base station and at least one other transmitter.

6. An apparatus comprising:
   a transmitter configured to transmit a transmission;
   means for spreading non-broadcast content in a first time slot of the transmission with a first spreading code specific to the transmitter; and
   means for spreading broadcast content in a second time slot adjacent to the first time slot in the transmission with a broadcast spreading code common to the transmitter and at least one other transmitter;
   wherein the transmitter is further configured to time-synchronize the transmission of the spread broadcast content with the at least one other transmitter.

7. The apparatus of claim 6, wherein the transmitter is further configured to select a waveform, wherein the waveform is one of a synchronized broadcast waveform associated with the broadcast content and a code division waveform associated with the non-broadcast content, and further comprising means for selectively activating one of the means for spreading the non-broadcast content and the means for spreading the broadcast content.

8. The apparatus of claim 6, wherein the broadcast spreading code is a pseudo-noise (PN) spreading code.

9. The apparatus of claim 8, wherein the transmission of the spread broadcast content includes discrete multi-tone (DMT) modulation of the spread broadcast content.

10. A non-transitory computer-readable storage medium including executable instructions executable by a processor to cause the processor to:
    spread non-broadcast content in a first time slot of a transmission with a first spreading code specific to a transmitter of a base station;
    spread broadcast content in a second time slot adjacent to the first time slot in the transmission with a broadcast spreading code common to the transmitter of the base station and at least one other transmitter; and
    time-synchronize the transmission of the spread broadcast content with the at least one other transmitter.

11. A method comprising:
    receiving, from a transmitter of a base station, non-broadcast content in a first time slot of a first transmission, wherein receiving the non-broadcast content includes despreading the non-broadcast content using a first spreading code specific to the transmitter of the base station; and
    receiving synchronized broadcast content in a second time slot adjacent to the first time slot of the first transmission, wherein receiving the synchronized broadcast content includes despreading the non-broadcast content using a broadcast spreading code common to the transmitter of the base station and a second transmitter.

12. The method of claim 11, wherein receiving the synchronized broadcast content further comprises equalizing demodulated broadcast content based on training from a broadcast pilot.

* * * * *